Patented Aug. 2, 1949

2,478,066

UNITED STATES PATENT OFFICE 2,478,066

POLYMERIZATION OF OLEFINS IN THE PRESENCE OF NITROGEN COMPOUNDS

Adrianus Johannes van Peski, deceased, late of Amsterdam, Netherlands, by Carolina Catharina Johanna van Peski, executrix, Bussum, Netherlands, assignor to Shell Development Company, San Francisco, Calif., a corporation of Delaware No Drawing. Application August 7, 1947, Serial No. 767,320. In the Netherlands April 20, 1944

Section 1, Public Law 690, August 8, 1946
Patent expires April 20, 1964

11 Claims. (Cl. 260—683.15)

This invention relates to the production of olefin polymers, particularly to the manufacture of higher molecular hydrocarbons such as gasoline and lubricating oil from lower olefins, and provides an especially advantageous method of carrying out such polymerizations in the presence of compounds which form free radicals under the reaction conditions.

It has been suggested that the non-catalytic polymerization of olefins takes place by a free radical mechanism, and it has been proposed to promote polymerization by the addition of compounds which form free radicals, particularly the metal alkyls such as the lead tetraalkyls and mercury dialkyls. It has now been found that improved results may be obtained by the use in polymerization reactions of an especially advantageous class of compounds, namely, the acidic organic nitrogen compounds which derive their acidic properties solely from the nitrogen-containing group of the molecule. These polymerization promoters consist of two main subgroups of related compounds, i. e. the nitrohydrocarbons and the imino compounds. Of these, the imino compounds offer special advantages. The simplest of imino compounds which may be used are the imines themselves, which include the aldimines

and the ketimines

and the closely related amidines

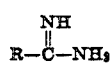

oximes

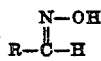

and

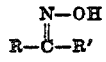

hydrazones

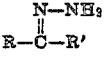

and azines which include the aldazines

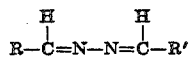

and the ketazines

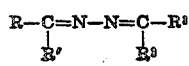

Other related imino compounds which may also be used include the imino amines

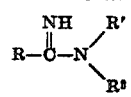

and the imido esters

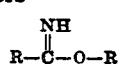

These compounds may all be represented by the formula

where R represents H or hydrocarbon, R' represents H, hydrocarbon,

or O—R, and A represents H, OH, NH$_2$ or

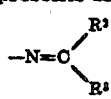

in which R$^2$ and R$^3$ represent H or hydrocarbon. Together with the closely related acidic nitrohydrocarbons, particularly the nitroalkanes and nitrocycloalkanes, these compounds have been found to give especially advantageous results in the polymerization of a wide variety of olefins. Under the reaction conditions they decompose and liberate free radicals which catalyze the desired olefin polymerization.

Typical examples of olefins which may be polymerized according to the invention are the alkenes and cycloalkenes such, for instance, as ethylene, propylene, the normal and iso-butylenes, the amylenes, cyclopentene, the methyl cyclopentenes, cyclohexene, the methyl cyclohexenes, and higher olefins such, for instance, as the olefins of cracked gasoline or those of still higher boiling point such as the so-called cracked wax olefins obtained by cracking, preferably in the vapor phase, paraffin wax and the like to produce olefins of 8 to about 22 carbon atoms. The olefins may be used as pure or substantially pure individual compounds or as suitable mixtures thereof with or without compounds which do not interfere with the reaction. Fractions of petroleum cracking products wherein the olefins are present with the corresponding paraffins are particularly advantageous starting materials for the process.

The process may be carried out in the liquid or vapor phase. Temperatures between about 100° C. and 400° C. are suitable, preferably temperatures between 200° C. and 300° C. Elevated pressures are especially advantageous in the reaction, and it has been found that pressures above 100 atmospheres are particularly desirable in giving appreciably higher yields of polymerization products under otherwise similar conditions. The higher pressures of 100 to 1000 atmospheres or more are especially advantageous in the production of lubricating oils according to the invention. The average degree of polymerization decreases with increased temperature and increases with increased pressure. By the selection of the proper combination of temperature and pressure, a wide variety of products may be produced. Those of lower molecular weight, for example, boiling in the gasoline range, are usually more unsaturated in character than the higher polymerization products, and for the production of gasoline blending agents according to the process it is usually desirable to hydrogenate the initial polymer. The products so obtained have high octane numbers. The higher boiling polymers in the lubricating oil range have high viscosity indices and a high pour point indicating a low degree of branching. Still higher polymers having, for instance, molecular weights exceeding 10,000 may be obtained. These solid hydrocarbons may advantageously be used in the manufacture of molded products. The following example shows the advantages of the new process.

Example I

When heating about 250 g. of pure propylene in an autoclave with a capacity of 1 liter at 300° C. for various periods of time at an initial pressure of 250 atms., the following results were obtained:

After a reaction period of 1 hr., 3½ g. of liquid polymerization product

After a reaction period of 1½ hrs., 4 g. of liquid polymerization product

After a reaction period of 2 hrs., 7 g. of liquid polymerization product

After a reaction period of 2½ hrs., 9 g. of liquid polymerization product

After a reaction period of 3 hrs., 10½ g. of liquid polymerization product

After a reaction period of 3½ hrs., 12 g. of liquid polymerization product

The increase in yield from adding various small amounts of imino compounds according to the invention is shown in the following table in comparison with the results obtainable by the use, under the same conditions, of metal alkyls and basic nitrogen compounds:

In all cases about 30 per cent by volume of the polymerization product consisted of products with a boiling point <150° C., mainly consisting of isohexenes and iso-nonenes, the remainder being made up of higher boiling polymerization products.

Other examples of imino compounds which may be used in the same way are, for instance, acetamidine, ethenyl-diphenyl amidine, aldehydephenyl-hydrazone, acetone-phenyl-hydrazone, isonitrosoacetone, methylene imine, ethylidene imine, benzylidene imine, trimeric methylene methyl imine, ethylidene phenyl imine, benzylidene phenyl imine, anhydroformalde-aniline, hydrobenzamide, isopropylidene imine, acetophenoneimine, isopropylidene phenyl imine, isophoroneimine, formamidine, benzamidine, phenylbenzamidine, N,N'-diphenyl benzamidine, N,N-diphenyl benzamidine, benzil dioxime, methyldecyl ketoxime, acetimido ethyl ester.

The production of imidines and acylamidines which are suitable for use as polymerization promoters according to the invention is described, for instance, in U. S. Patent 2,196,447. Especially advantageous methods of producing imines which may also be used are disclosed in copending applications Serial No. 522,376, filed February 14, 1944 now Patent No. 2,422,013, and Serial No. 717,322, filed December 19, 1946. As a rule, the preferred imino compounds are those having hydrocarbon radicals of not more than six carbon atoms.

Example II

About 500 g. of pure propene were heated together with 2 g. of nitro-ethane at different temperatures under a pressure of 250 atms. for 1½ hours.

The results are listed in the following table, as well as the yields of polymerization product, in case no nitro-ethane was added.

| Temp., °C. | G. Polymerization Product without Nitro-ethane | G. Polymerization Product in the Presence of 2 g. Nitro-ethane per approx. 500 g. of Propene |
| --- | --- | --- |
| 275 | 0 | 17 |
| 300 | 12 | 68 |
| 325 | 36 | 136 |
| 350 | 124 | 232 |
| 375 | 324 | 369 |

Example III

Six hundred grams of propene, to which 4.5 g. of methyl-n-propyl-ketazine had been added, were heated to 230° C., the initial pressure being 250 atms. Forty-two grams of polymerization product were then obtained, 16 per cent of which consisted of hydrocarbons with a boiling point

| Polymerization Promoters | Number of g. Polymerization Promoter per 250 g. propene | Reaction Period In Hours | Grams of Polymerization Product | Grams of Polymer per Hour per g. Polymerization Promoter |
| --- | --- | --- | --- | --- |
| acetoxime | 0.9 | 1.5 | 71 | 54.8 |
| acetone hydrazone | 0.9 | 1.5 | 60 | 44.4 |
| acetaldazine | 1.0 | 1.5 | 63 | 42 |
| pinacoline-oxine | 1.4 | 1½ | 64 | 39.2 |
| diethylketoxime | 1.3 | 1.5 | 64 | 33 |
| methyl-n-propylketazine | 2.1 | 1.5 | 100 | 31.7 |
| methyl-t-butylketazine | 2.4 | 1.5 | 109 | 30.2 |
| dimethylketazine | 1.4 | 2.5 | 94 | 27 |
| mesityloxime | 1.4 | 1.5 | 50 | 24 |
| tetraethyl lead | 1.0 | 1.5 | 35 | 23 |
| benzene diazodimethylamide | 1.8 | 1.5 | 56 | 20.6 |
| tetramethyl lead | 0.9 | 1.5 | 27.5 | 20.3 |
| di-azo-aminobenzene | 1.0 | 2.5 | 36 | 14.4 |
| di-azo-amino-p-toluene | 1.0 | 3 | 37 | 12.3 |
| azo-toluene | 1.0 | 2.5 | 18 | 7.2 | below 150° C. Forty per cent of the product was made up of lubricating oil with a boiling point above 200° C. (10 mm.).

When no methyl-n-propylketazine was added, no polymerization took place.

Example IV

When heating 160 g. of pure ethene, to which previously 0.23 g. of acetoxime had been added, at a temperature of 260° C. and a pressure of 250 atms. for 6½ hours, 11 g. of polymerization product were obtained, 90 per cent of which consisted of a fraction with a boiling point exceeding 200° C. under a pressure of 10 mm. and an average molecular weight of 950. Without the addition of acetoxime no polymerization was observed at this temperature.

Example V

When heating 140 g. of pure ethene, to which 0.1 g. of methyl-n-propylketazine had previously been added, at a temperature of 240° C. and a pressure of about 950 atms. for three hours, 100 g. of polymerization product were obtained with an average molecular weight exceeding 10,000. Without the addition of methyl-n-propylketazine, under otherwise similar conditions, only 5 g. of polymerization product with corresponding properties were obtained.

Example VI

Ethylene was polymerized in the same manner at a temperature of 260° C. and initial pressure of 250 atms., using methyl normal propyl ketazine as the promoter, and it was found that for the per gram mole of polymer used 1310 gram moles of olefin were polymerized, while at a temperature of 300° C. 1460 gram moles of ethylene were polymerized per gram mole of methyl normal propyl ketazine used.

Example VII

Propylene was polymerized in a series of batches using different nitro compounds as the promoters. In all cases a polymerization temperature of 300° C. was used and a pressure of 250 atms. was applied at the start. The reaction time was 1.5 to 3.5 hours.

| Nitro Compound Added | Concentration of Nitro Compound in the Reaction Mixture | G. of Polymer Produced per liter of Propylene |
|---|---|---|
| | Per cent | |
| Nitromethane | 0.4 | 154 |
| Nitroethane | 0.4 | 304 |
| Nitropropane | 0.44 | 168 |
| 2-Nitropropane | 0.4 | 220 |
| 1,1-Dinitro-2-dimethyl-aminoethane | 0.2 | 58 |

Example VIII

The effect of concentration of methyl-n-propylketazine in the polymerization of propylene at 320° C. and an initial pressure of 250 atms. is shown by the following results:

| Concentration of Methyl-n-propylketazine g. moles×10⁻³ per liter | G. moles of Propylene Polymerized per g. mole of Methyl-n-propylketazine |
|---|---|
| 1.5 | 637 |
| 4.5 | 567 |
| 7.6 | 370 |
| 13.4 | 265 |

As a rule, the polymerization obtained with a given amount of imino compound or nitrohydrocarbon decreases with the concentration of these promoters in the hydrocarbon mixture being used. However, too low a concentration of promoter will unduly reduce plant capacity—hence, concentrations of about 0.0005 to 0.05, preferably 0.002 to 0.01, gram moles per liter are used.

No effect on the reaction was produced by the wall of the reaction vessel or the presence of slight impurities in the feed. Thus, increasing the wall surface six times by filling the reactor with fragments of glass produced no substantial influence on the reaction. Small amounts of impurities such as water, sulfur and lubricating oil in the feed also had no effect. However, excessive dilution of the olefin with paraffin reduces the yield. Olefin mixtures polymerize to about the same extent that they would independently so that it is possible to interpolate from the results for the pure olefins and obtain the yields for any given mixture.

The quality of the products appears to be independent of the particular imino compound or nitrohydrocarbon used in the reaction. Typical lubricating oils obtained by polymerizing ethylene at 300° C. and 200 atms. have the following properties:

| Product | Cc. | $V_k$ 50° C. in cs. | V. I. | Mol. Weight | Percent of Paraffin | Percent of Naphthenes |
|---|---|---|---|---|---|---|
| Original product | 190 | 127.5 | 116 | 800 | 93 | 7 |
| Fraction 1 | 60 | 35.2 | 113 | 503 | 89 | 11 |
| Fraction 2 | 60 | 97.8 | 76 | 712 | 90 | 10 |
| Residue | 65 | 762.1 | 44 | 1,500 | 92 | 8 |

It will be seen from the foregoing that the invention offers many advantages over prior methods of polymerizing olefins. It will be understood, however, that it is not limited to the details disclosed by way of example since many variations may be made in the process. Thus, for example, while polymerization in the presence of the specified nitrohydrocarbons and imino compounds as the sole polymerization promoters has been emphasized, these promoters can also be used in conjunction with other polymerization promoters or with catalysts such, for instance, as solid phosphoric acid catalysts and the like. In such methods of operation the polymerization using the imino compounds and nitrohydrocarbons can be carried out either subsequent or prior to the phosphoric acid-catalyzed polymerization or simultaneously therewith. Batch or intermittent polymerization may be used as well as continuous reaction.

The invention claimed is:

1. A process of polymerizing an olefin which comprises heating said olefin to a temperature of at least 100° C. in the presence of an acidic organic nitrogen compound which derives its acidic properties solely from the nitrogen-containing group of the molecule and which decomposes under the reaction conditions.

2. A process of polymerizing an olefin which comprises heating said olefin to a temperature between 100° C. and 400° C. in the presence of an acidic organic nitrogen compound having a trivalent nitrogen atom linked by a double bond to a single carbon atom of a divalent organic radical, which organic nitrogen compound decomposes under the reaction conditions.

3. A process of producing a polymer which comprises heating a normally gaseous alkene at a temperature of 100° C. to 400° C. and a pressure in excess of 100 atmospheres in the presence of an acidic organic nitrogen compound having a trivalent nitrogen atom linked by a double bond to a single carbon atom of a divalent hydrocarbon radical, which organic nitrogen compound decomposes under the reaction conditions.

4. A process of polymerizing an olefin which comprises heating said olefin to a temperature above 100° C. under a pressure of at least 100 atmospheres in the presence of an organic nitrogen compound which decomposes under the reaction conditions and which contains a trivalent nitrogen atom directly linked by a double bond to an alkylidene radical.

5. A process of producing polymers which comprises heating an alkene at a temperature above 100° C. and a pressure in excess of 100 atmospheres in the presence of an organic nitrogen compound having a —C=N— group in the molecule, which compound decomposes under the reaction conditions.

6. A process of producing a polymer which comprises heating an alkene at a temperature of 100° C. to 400° C. under a pressure of at least 100 atmospheres in the presence of a nitrohydrocarbon which decomposes under the reaction conditions.

7. A process of producing polymers which comprises heating a normally gaseous olefin at a temperature above 100° C. in the presence of an aliphatic nitrohydrocarbon of not more than 6 carbon atoms per molecule.

8. A process of polymerizing an olefin which comprises heating said olefin to a temperature between 100° C. and 400° C. under a pressure of at least 100 atmospheres in the presence of a hydrocarbon azine which decomposes under the reaction conditions.

9. A process of producing polymers which comprises heating a normally gaseous olefin at a temperature above 100° C. in the presence of an acidic ketazine which decomposes under the reaction conditions.

10. A process of producing a polymer which comprises heating an alkene at a temperature of 100° C. to 400° C. in the presence of an aliphatic ketazine having not more than 6 carbon atoms per molcule.

11. A process of producing polymers which comprises heating a normally gaseous olefin at a temperature between 200° C. and 300° C. in the presence of a methylpropylketazine.

CAROLINA CATHARINA JOHANNA
         VAN PESKI,
*Executrix of the Estate of Adrianus Johannes van Peski, Deceased.*

REFERENCES CITED

The following references are of record in the file of this patent:

UNITED STATES PATENTS

| Number | Name | Date |
|---|---|---|
| 2,156,718 | Bent et al. | May 2, 1939 |
| 2,237,459 | Thompson | Apr. 8, 1941 |
| 2,377,411 | Frey | June 5, 1945 |
| 2,398,926 | Dorough | Apr. 23, 1946 |
| 2,405,950 | Hanford | Aug. 20, 1946 |
| 2,439,528 | Roedel | Apr. 13, 1948 |
| 2,462,678 | Roedel | Feb. 22, 1949 |
| 2,462,680 | Sargent | Feb. 22, 1949 |